Patented Mar. 14, 1933

1,901,288

UNITED STATES PATENT OFFICE

ALFRED DAVIDSON AND ARNOLD SHEPHERDSON, OF BLACKLEY, MANCHESTER, ENGLAND, ASSIGNORS TO BRITISH DYESTUFFS CORPORATION LIMITED, OF BLACKLEY, MANCHESTER, ENGLAND

MANUFACTURE OF VAT DYESTUFFS AND OF INTERMEDIATE PRODUCTS RELATING THERETO

No Drawing. Application filed May 9, 1928, Serial No. 276,500, and in Great Britain May 26, 1927.

According to the present invention 1-anilidoanthraquinone-2-carboxylic acid is subjected to chlorination, the final product being a vat dyestuff, but the chlorination proceeds in two stages and we desire also to claim the manufacture of the intermediate chlorination product.

In the first chlorination stage 1-anilidoanthraquinone-2-carboxylic acid is heated, in an organic solvent of high boiling-point such as trichlorobenzene, with thionyl chloride, phosphorus pentachloride or other such reagent until hydrochloric acid is no longer evolved. At this stage the intermediate chlorination product is formed. To form the intermediate chlorination product, the thionyl chloride or other reagent is used in an amount in excess of that merely necessary to form the corresponding acid chloride of the anthraquinone carboxylic acid.

To obtain the new vat dyestuff without isolating the intermediate chlorination product, chlorine or other chlorination agent, is led into the solution so obtained at 160–190° C. and the vat dyestuff is formed. The chlorinaton may be carried out in the presence or absence of a small proportion of a chlorine carrier such as iodine.

*Example 1.*—100 gms. of 1-anilidoanthraquinone-2-carboxylic acid, 300 gms. of trichlorobenzene and 100 gms. of thionyl chloride are heated together, with stirring, so that the temperature rises gradually during 2 hours to 190° C. At this point a rapid current of chlorine (about 250 cc. per min.) is passed into the solution, and is continued for about 4 hours. On cooling the solution a solid separates, which is filtered off, washed with benzene to remove trichlorobenezene, and dried. The product so obtained is a brownish-red crystalline powder which dissolves in concentrated sulphuric acid to a reddish-orange solution from which the dyestuff separates on dilution with water as a bluish-red precipitate. The substance gives a violet vat with alkaline hydrosulphite and dyes cotton in pink shades. A similar dyestuff is obtained when using 1-p-toluidoanthraquinone-2-carboxylic acid as starting material.

*Example 2.*—100 parts of 1-beta-naphthylaminoanthraquinone-2-carboxylic acid are stirred with 400 parts of trichlorobenzene and 100 parts of thionyl chloride for 24 hours at the ordinary temperature, then slowly raised during 4 hours to 180° C. Iodine (1 part) is now added and a rapid current of chlorine passed in for 4 hours, keeping the temperature at 180–190° C. On cooling, the solid, which separates is treated as in Example 1. After treatment with concentrated sulphuric acid it forms a brown powder which dyes cotton orange-brown from a red vat.

Although in the foregoing the nature of the present invention has been described by reference solely to 1-anilido- and 1-beta-naphthylamino-anthraquinone-2-carboxylic acid, the invention is not confined to the treatment of these bodies alone, but analogous bodies can be used in the same way and analogous chlorination products obtained.

What we claim and desire to secure by Letters Patent is:—

1. In the manufacture of new chlorinated vat dyes the process which comprises mixing together about 100 parts of 1-anilido anthraquinone 2-carboxylic acid, and about 100 parts of thionyl chloride with trichlorobenzene, heating the mixture thus obtained to about 190° C. until the evolution of hydrochloric acid ceases, thus producing an intermediate chlorination product, then passing a rapid current of chlorine through the hot reaction mixture thus obtained until further chlorination is effected and the final chlorinated vat dyestuff is obtained, cooling the solution and filtering off the solid reaction product which separates, washing the solid product with benzene to remove trichlorobenzene and drying, the said product being obtained as a brownish red crystal powder which dissolves in concentrated sulphuric acid giving a reddish orange solution from which upon dilution the dystuff separates a bluish-red precipitate, said product giving a violet vat with alkaline hydrosulphite and dyeing cotton in pink shades.

2. In the manufacture of new chlorinated vat dyes from 1-beta naphthylamino anthraquinone-2-carboxylic acid, the process which comprises mixing together about 100 parts of beta-naphthylamino anthraquinone and about 100 parts of thionyl chloride with trichlorobenzene at ordinary temperatures, slowly heating the mixture thus obtained to about 180° C. and continuing the heating until the evolution of hydrochloric acid ceases, thereby forming an intermediate chlorination product, then adding a small amount of iodine and passing a rapid current of chlorine through the hot reaction thus obtained while maintaining the temperature at 180 to 190° C. until the reaction product is further chlorinated to give the final chlorinated vat dye, cooling the solution thus obtained and recovering and isolating the solid reaction product which separates from said solution, thus obtaining the said new chlorinated vat dyestuff in the form of a brown powder, said dyestuff giving a red vat from which cotton is dyed in orange-brown shades.

3. In the manufacture of new chlorinated vat dyes from 1-arylamino anthraquinone-2-carboxylic acid, the process which comprises mixing together about 100 parts of a 1-arylamino anthraquinone 2-carboxylic acid and about 100 parts of thionyl chloride with trichlorobenzene, heating the mixture thus obtained to a temperature between 180 and 190° C. until the evolution of hydrochloric acid ceases, thereby producing an intermediate chlorination product, then passing a rapid current of chlorine through the hot reaction mixture thus obtained while maintaining it at a temperature between 180 and 190° C. until further chlorination is effected, and cooling the solution thus obtained and separating the solid new chlorinated vat dyestuff thus obtained.

4. In the manufacture of new chlorinated vat dyes from 1-arylamino anthraquinone-2-carboxylic acid compounds, the step which comprises heating to a temperature between 180 and 190° C., a mixture comprising said anthraquinone carboxylic acid compound and thionyl chloride in the presence of a high boiling solvent, the amount of thionyl chloride being greater than that necessary to form the corresponding acid chloride of said anthraquinone carboxylic acid compound.

In testimony whereof we affix our signatures.

ALFRED DAVIDSON.
ARNOLD SHEPHERDSON.